United States Patent
Lin

(10) Patent No.: US 9,200,651 B2
(45) Date of Patent: Dec. 1, 2015

(54) HEIGHT ADJUSTMENT ASSEMBLY FOR USE IN BATHING SUPPLIES

(71) Applicant: Xiamen Runner Industrial Corporation, Xiamen (CN)

(72) Inventor: Chun-hui Lin, Xiamen (CN)

(73) Assignee: XIAMEN RUNNER INDUSTRIAL CORPORATION, Xiamen (CN)

( * ) Notice: Subject to any disclaimer, the term of this patent is extended or adjusted under 35 U.S.C. 154(b) by 500 days.

(21) Appl. No.: 13/845,465

(22) Filed: Mar. 18, 2013

(65) Prior Publication Data

US 2014/0064836 A1 Mar. 6, 2014

(30) Foreign Application Priority Data

Aug. 29, 2012 (CN) .......................... 2012 1 0311096

(51) Int. Cl.
*F16B 2/10* (2006.01)
*A47K 3/28* (2006.01)
*E03C 1/06* (2006.01)

(52) U.S. Cl.
CPC . *F16B 2/10* (2013.01); *A47K 3/281* (2013.01); *E03C 1/066* (2013.01); *Y10T 403/595* (2015.01)

(58) Field of Classification Search
CPC ....... A61B 17/6466; F16B 2/00; F16B 2/005; F16B 2/02; F16B 2/10; F16B 2/18; B25B 1/06; B25B 1/12; B25B 5/068; E03C 1/06; E03C 1/066; Y10T 403/7194; Y10T 403/595; Y10T 403/599; Y10T 403/7062; Y10T 403/7064; Y10T 403/7067; Y10T 403/7071

USPC ................... 248/316.1, 316.2, 316.5
See application file for complete search history.

(56) References Cited

U.S. PATENT DOCUMENTS

| | | | | |
|---|---|---|---|---|
| 7,407,140 B2 * | 8/2008 | Sen | ......... | E03C 1/066 239/283 |
| 7,766,291 B2 * | 8/2010 | Eilmus | ...... | E03C 1/06 248/222.11 |
| 8,448,270 B2 * | 5/2013 | Yang | ....... | E03C 1/066 248/218.4 |
| 2013/0269793 A1 * | 10/2013 | Tsai | ........ | E03C 1/066 137/343 |

FOREIGN PATENT DOCUMENTS

| | | | | |
|---|---|---|---|---|
| DE | 10303169 A1 * | 7/2004 | ............. | E03C 1/06 |
| DE | 102011008193 A1 * | 7/2012 | ............. | E03C 1/066 |
| DK | EP 1160384 A1 * | 12/2001 | ............. | E03C 1/06 |
| TW | EP 1653015 A1 * | 5/2006 | ............. | E03C 1/06 |

* cited by examiner

*Primary Examiner* — Daniel Wiley
(74) *Attorney, Agent, or Firm* — Chun-Ming Shih

(57) ABSTRACT

A height adjustment assembly includes a joint having a through hole defined therethrough, a tube insertable through the through hole, at least one clamping plate with one distal end thereof pivotally connected to the joint to securely engage with an outer periphery of the tube and an adjustment handle movably connected to the joint and having at least one annular ear integrally formed with the adjustment handle to enclose a distal end of the joint so as to enclose therein a free end of the clamping plate, a block formed inside the at least one annular to securely engage with the free end of the clamping plate such that rotation of the adjustment handle forces the clamping plate away from engagement with the outer periphery of the tube to allow the tube to move relative to the joint.

10 Claims, 4 Drawing Sheets

_US 9,200,651 B2_

HEIGHT ADJUSTMENT ASSEMBLY FOR USE IN BATHING SUPPLIES

BACKGROUND OF THE INVENTION

1. Field of the Invention

This invention is related to a height adjustment assembly, and more particular to a height adjustment assembly for use in bathing supplies to enable the user to readily adjust height of a support.

2. Description of Related Art

In conventional bathroom industry or industrial areas, bathing supplies normally involve a support for carrying thereon items such as a soap, a bottle of shampoo, a toothpaste ... etc. Therefore, when the user is trying to use such as soap, the user is able to readily reach the soap for whatever purpose required. However, because each user has a height variant from one another, it is not so easy for a short person to reach the item placed on a high position and vice versa. To cope with this situation, a height adjustment structure is provided to allow the user to change/adjust height of the support when necessary. Basically, there are two different categories for the height adjustment mechanism: one is to use threading connection to allow the user to change position of a tube relative to the threading connection and the other one is to use a spring-loaded locking mechanism to position a tube relative to the spring-loaded locking mechanism. Both adjustment mechanisms require manual operation of the release and fastening of the tube. What is more is that in order to have higher grasping force to the tube, the user needs to apply a relatively corresponding force to the threading connection mechanism and so does the user when releasing of the tube is required. To the spring-loaded locking mechanism, the greater force to ensure the position of the tube, the greater force required to release the positioning of the tube.

None of the above adjustment mechanism is friendly for handicapped personnel, especially those with arm or hand disabilities. In addition, these two categories are also not friendly for those with little muscles to apply the strength required to accomplish the designed purpose.

SUMMARY OF THE INVENTION

The primary objective of the present invention is to provide a height adjustment assembly to enable the user to readily adjust height of a tube relative to the assembly.

Another objective of the present invention is to provide a joint for extension of a tube and a clamping plate pivotally connected to the joint and adapted to selectively and securely engage with an outer periphery of the tube to secure and release the tube as required.

Still another objective of the present invention is to provide a spring adapted to be sandwiched between the clamping plate and the outer periphery of the tube to increase holding force to the tube.

A further objective of the present invention is to provide a pad adapted to be sandwiched between the spring and the outer periphery of the tube to increase holding force to the tube.

Yet another objective of the present invention is to provide an adjustment handle rotatably connected to the joint and having a slanted surface to correspond to and securely engage with the clamping plate such that when the adjustment handle is rotated relative to the joint, movement of the slanted surface allows the clamping plate which originally securely holds the tube in position to release engagement with the outer periphery of the tube such that the tube is able to change its position relative to the adjustment handle.

BRIEF DESCRIPTION OF THE DRAWINGS

The preferred embodiment(s) of the invention, as well as its many advantages, may be further understood by the following detailed description and accompanying drawings.

DETAILED DESCRIPTION OF THE INVENTION

Figure 1:
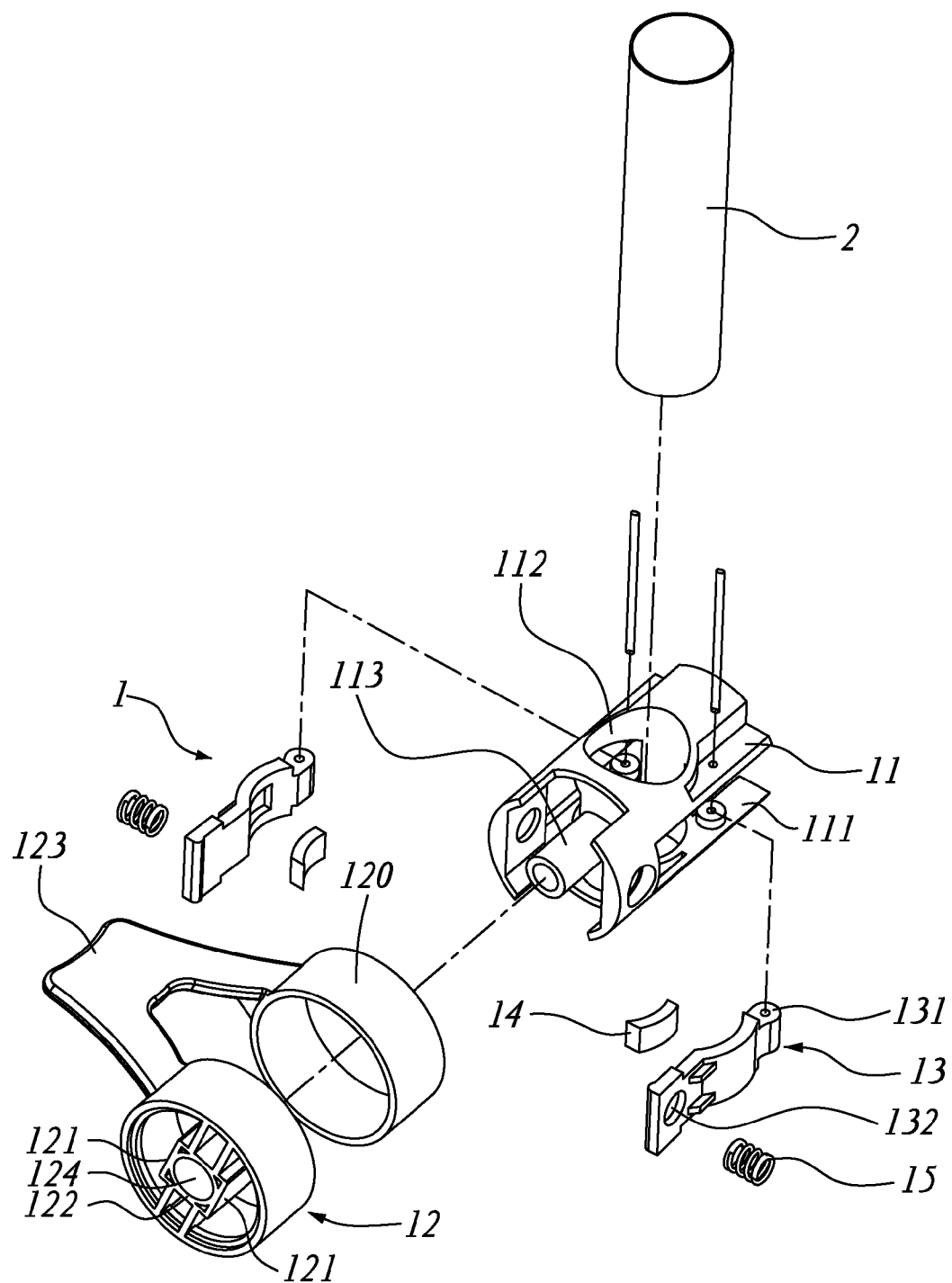
FIG. 1 is an exploded perspective view showing elements of the preferred embodiment of the present invention.

With reference to FIG. 1, a preferred embodiment of the height adjustment assembly 1 constructed in accordance with the present invention includes a joint 11, an adjustment handle 12 rotatably connected to the joint 11, a clamping plate 13 pivotally connected to the joint 11 and a tube 2 extendable through the joint 11 to be abutted by the clamping plate 13.

The joint 11 is tubular in shape and has at least one cutout 111 defined in a distal end thereof, a centrally defined through hole 112 to allow the tube 2 to extend therethrough and a finger 113 integrally extending from the joint 11.

There is provided with at least one (two are provided) clamping plate 13. The clamping plate 13 is pivotally positioned in the cutout 111 via a pin insertable through a side face of the clamping plate 13 and stopped at a bottom face of the joint 11 to allow the clamping plate 13 to pivot relative to the joint 11. A midsection of the clamping plate 13 is configured to mate with an outer periphery of the tube 2 and a distal far end of the clamping plate 13 is provided with a receiving hole 132, a blind hole in the preferred embodiment. In the preferred embodiment of the present invention, the midsection of the clamping plate 13 is arcuate such that the midsection of the clamping plate 13 is able to engage with the outer periphery of the tube 2. In order to increase friction between the clamping plate 13 and the outer periphery of the tube 2, a pad 14, preferably made of rubber, is sandwiched between the midsection of the clamping plate 13 and the outer periphery of the tube 2 when the clamping plate 13 engages with the tube 2.

The adjustment handle 12 has a handle 123 and at least one (two are provided) annular ear 120 formed on a distal end of the handle 123. The annular ear 120 is provided to surround one distal end of the joint 11 so as to enclose therein the free distal end of the clamping plate 13. In addition, the annular ear 120 has a block 122, preferably rectangular in shape, centrally formed inside the annular ear 120 and having a slanted surface 121 formed on an outer face of the block 122 to correspond to the free distal end of the clamping plate 13 and a central hole 124 defined in the block 122 to correspond to the finger 113 of the joint 11.

Figure 2:
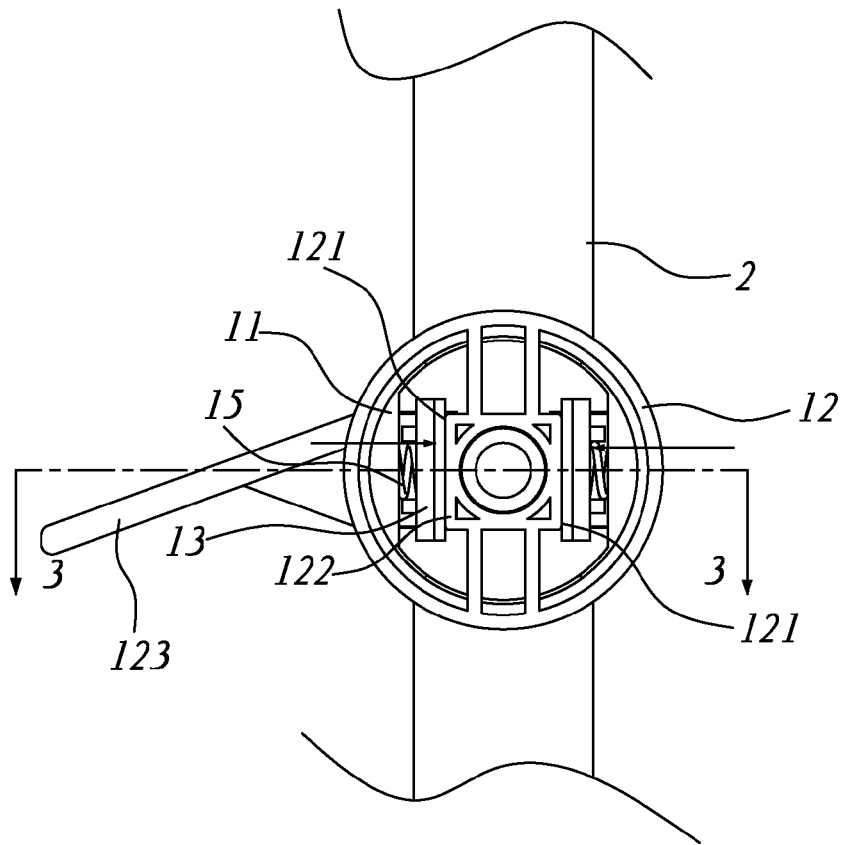
FIG. 2 is a schematic side plan view showing the position of the tube relative to the assembly of the preferred embodiment of the present invention.
Figure 3:
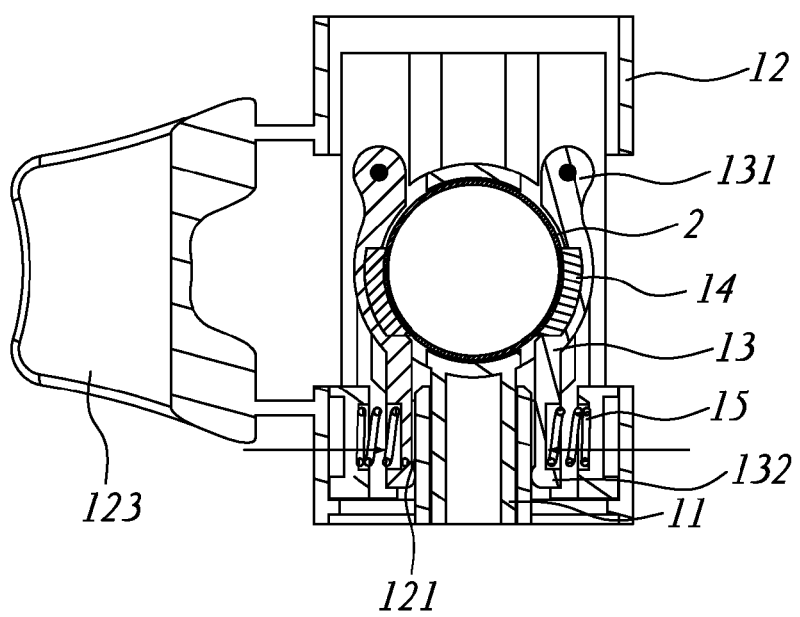
FIG. 3 is a partially cross-sectioned view showing the height adjustment assembly of the preferred embodiment of the present invention according to line 3-3 of FIG. 2.

With reference to FIGS. 2 and 3, when assembly of the height adjustment assembly is processed, it is noted that the distal end 131 of the clamping plate 13 is pivotally connected to the joint 11 via pins (not numbered) and the pad 14 is attached to the midsection of the clamping plate 13. It is to be noted that a spring 15 is received in the receiving hole 132 of the free end of the clamping plate 13. Thereafter, the annular ear 120 is provided to surround the distal end of the joint 11 with the finger 113 of the joint 11 extending through the central hole 124 of the adjustment handle 12 so as to enclose therein the free end of the clamping plate 13. Consequently, a distal free end of the spring 15 is abutted against an inner surface of the annular ear 120 and the slanted surface 121 engages with the free end of the clamping plate 13. Finally, the tube 2 is extended through the through hole 112 of the joint 11 with the pad 14 securely engaging with the outer periphery of the tube 2.

Figure 4:
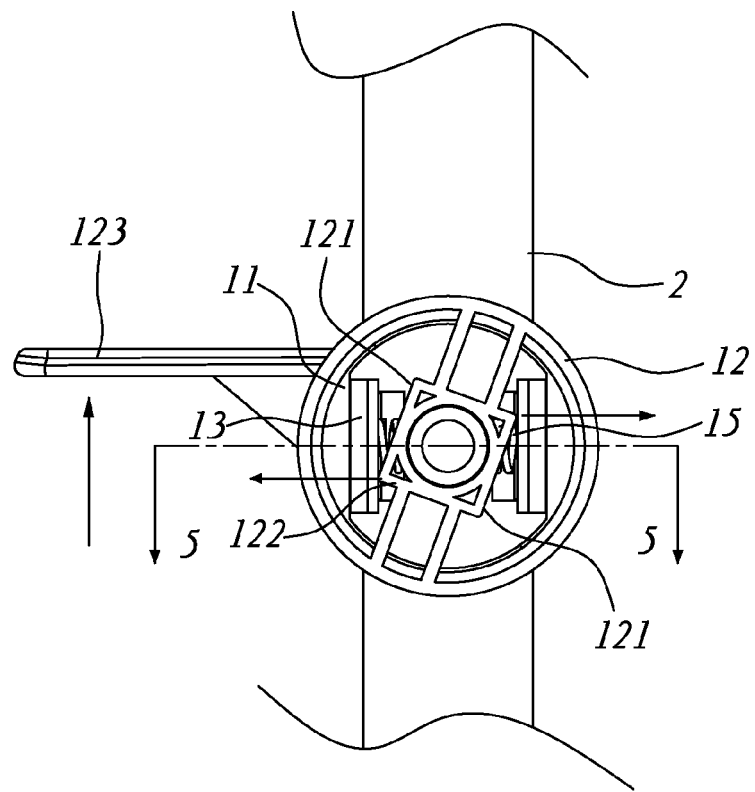
FIG. 4 is a schematic side plan showing the application of the height adjustment assembly of the preferred embodiment of the present invention.
Figure 5:
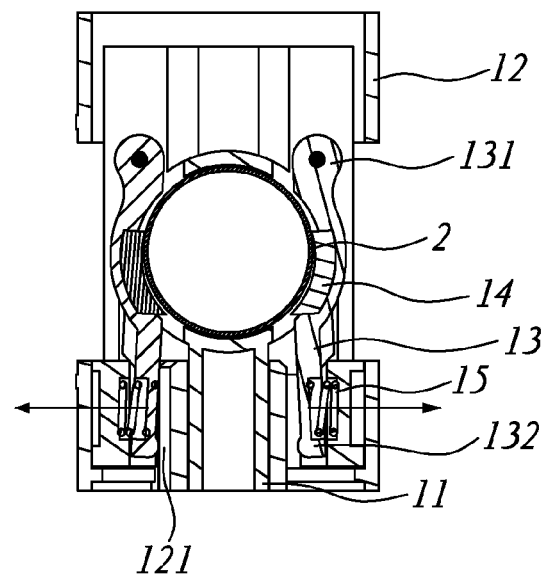
FIG. 5 is a partially cross-sectioned view showing the height adjustment assembly of the preferred embodiment of the present invention according to line 5-5 of FIG. 4.

When the height adjustment assembly of the preferred embodiment of the present invention is in application, as shown in FIGS. 4 and 5, the user may lift or depress the handle 123 to rotate the adjustment handle 12 relative to the joint 11. Due to the rotation of the adjustment handle 12, the slanted surface 121 of the block 122 forces the free end of the clamping plate 13 to move away from engagement with the tube 2 such that the tube 2 is able to move free relative to the joint 11 so as to accomplish the purpose of adjusting height of the tube 2. After height adjustment of the tube 2 is completed, due to energy stored and release while the clamping plate 13 is moving away from the tube 2 to compress the spring 15, the free end of the clamping plate 13 is moving back to the tube 2 with the pad 14 once again securely engaging with the outer periphery of the tube 2.

Figure 6:
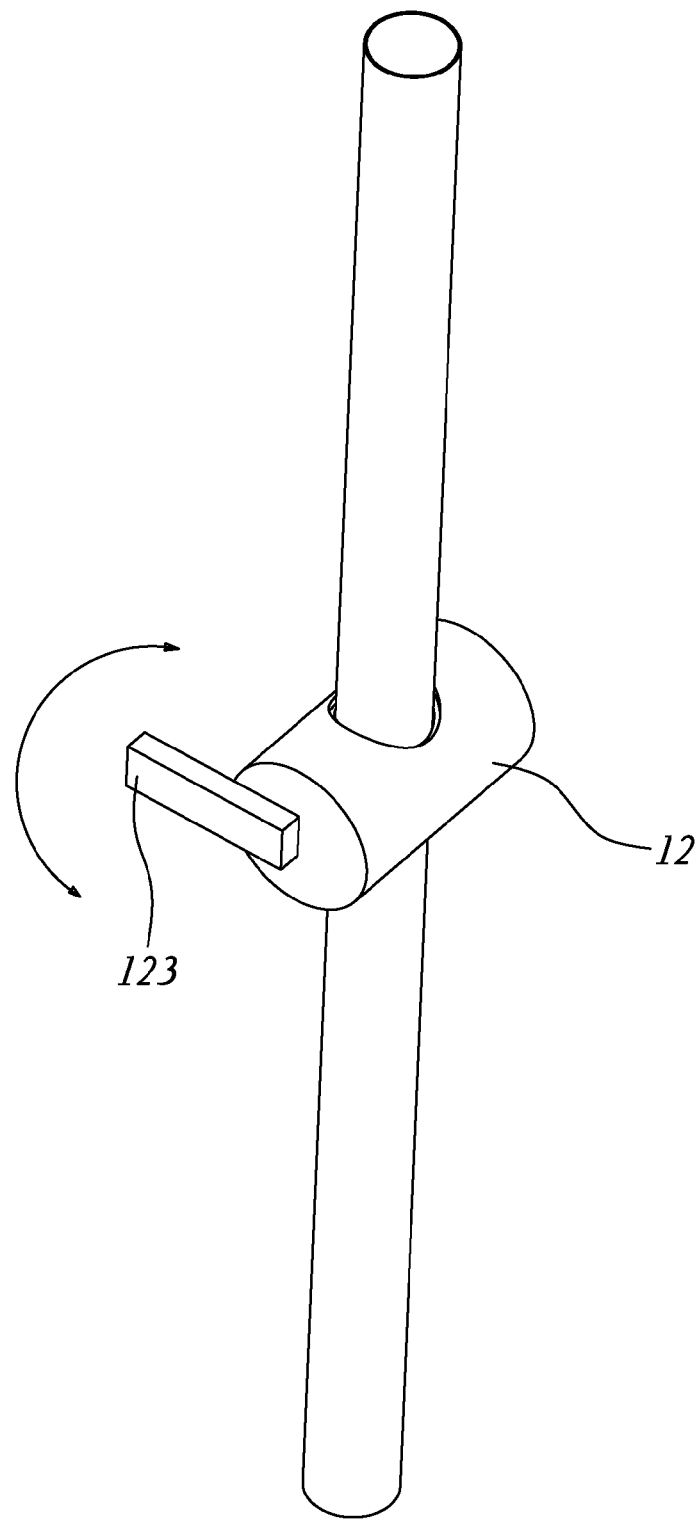
FIG. 6 is a perspective view showing a different embodiment of the adjustment handle constructed in accordance with the preferred embodiment of the present invention.

With reference to FIG. 6, it is noted that the handle 123 may also be configured at a side of the annular ear 120 in a different embodiment.

It is to be noted that the height adjustment assembly of the preferred embodiment of the present invention is readily operable for handicapped personnel. Besides, there is requirement for rotation or pressing any mechanism to accomplish the designed purpose.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:
1. A height adjustment assembly comprising:
a joint having:
   a through hole defined therethrough;
   a tube inserted through the through hole;
   at least one clamping plate comprising a distal end, a free end, and a midsection therebetween, wherein:
      the distal end is pivotally connected to the joint on a first side of the tube,
      the midsection is configured to matingly engage with an outer periphery of the tube; and
      the free end is aligned with, and biased towards, a second side of the tube opposite the first side; and
   an adjustment handle connected to the joint rotatably about an axis substantially perpendicular to and intersecting the through hole, and having:
      at least one annular ear integrally formed with the adjustment handle to enclose therein the free end of the clamping plate, and
      a non-circular block formed inside the at least one annular ear and rotatable about the axis such that an outer periphery of the block engages with the free end of the clamping plate; wherein rotation of the adjustment handle moves the joint between:
         a locked condition, wherein the block is positioned such that the free end of the clamping plate rests against the block at a first radius from the axis, such that the midsection is lockingly engaged with the outer periphery of the tube, and
         an unlocked condition, wherein the block is positioned such that the free end of the clamping plate rests against the block at a second radius, larger than the first radius, such that the midsection is disengaged from the outer periphery of the tube.

2. The assembly as claimed in claim 1, wherein the joint has at least one cutout defined to pivotally receive therein the at least one clamping plate.

3. The assembly as claimed in claim 1, wherein a pad is sandwiched between the outer periphery of the tube and the clamping plate to increase friction of the clamping plate to the tube.

4. The assembly as claimed in claim 3 further comprising a spring provided to the free end of the clamping plate and abutted against an inner periphery of the at least one annular ear to provide a recovery force to the clamping plate after the clamping plate is moved away from the engagement with the tube.

5. The assembly as claimed in claim 4, wherein the pad is sandwiched between the outer periphery of the tube and the midsection of the clamping plate to increase friction between the clamping plate and the outer periphery of the tube.

6. The assembly as claimed in claim 3, wherein the pad is sandwiched between the outer periphery of the tube and the midsection of the clamping plate to increase friction between the clamping plate and the outer periphery of the tube.

7. The assembly as claimed in claim 2, wherein a pad is sandwiched between the outer periphery of the tube and the clamping plate to increase friction of the clamping plate to the tube.

8. The assembly as claimed in claim 7 further comprising a spring provided to the free end of the clamping plate and abutted against an inner periphery of the at least one annular ear to provide a recovery force to the clamping plate after the clamping plate is moved away from the engagement with the tube.

9. The assembly as claimed in claim 8, wherein the pad is sandwiched between the outer periphery of the tube and the midsection of the clamping plate to increase friction between the clamping plate and the outer periphery of the tube.

10. The assembly as claimed in claim 7, wherein the pad is sandwiched between the outer periphery of the tube and the midsection of the clamping plate to increase friction between the clamping plate and the outer periphery of the tube.

* * * * *